(No Model.) 7 Sheets—Sheet 1.

H. PLATZ & S. L. HUIZER.
APPARATUS OR MACHINERY FOR CLOSING AND SECURING METAL TUBES.

No. 578,945. Patented Mar. 16, 1897.

Fig.1

Witnesses:
M. F. Boyle
J. B. Clautice

Inventors:
Hermann Platz
Samuel L. Huizer
By Thomas Dres Shelton
Attorney (No Model.) 7 Sheets—Sheet 4.

H. PLATZ & S. L. HUIZER.
APPARATUS OR MACHINERY FOR CLOSING AND SECURING METAL TUBES.

No. 578,945. Patented Mar. 16, 1897.

(No Model.) 7 Sheets—Sheet 5.
H. PLATZ & S. L. HUIZER.
APPARATUS OR MACHINERY FOR CLOSING AND SECURING METAL TUBES.

No. 578,945. Patented Mar. 16, 1897.

(No Model.) 7 Sheets—Sheet 7.
H. PLATZ & S. L. HUIZER.
APPARATUS OR MACHINERY FOR CLOSING AND SECURING METAL TUBES.

No. 578,945. Patented Mar. 16, 1897.

Witnesses:
M. F. Boyle
J. B. Colautice

Inventors:
Hermann Platz
Samuel L. Huizer
By Thomas Ives Stetson
Attorney

UNITED STATES PATENT OFFICE.

HERMANN PLATZ, OF CARLSRUHE, GERMANY, AND SAMUEL LEENDERT HUIZER, OF GRAVENHAGE, NETHERLANDS, ASSIGNORS TO THE DEUTSCHE METALLPATRONENFABRIK, OF CARLSRUHE, GERMANY.

APPARATUS OR MACHINERY FOR CLOSING AND SECURING METAL TUBES.

SPECIFICATION forming part of Letters Patent No. 578,945, dated March 16, 1897.

Application filed April 26, 1895. Serial No. 547,272. (No model.) Patented in Germany October 17, 1894, No. 82,532; in England January 19, 1895, No. 1,320; in France January 19, 1895, No. 244,466; in Belgium January 19, 1895, No. 113,707; in Switzerland January 19, 1895, No. 9,893; in Hong-Kong January 19, 1895; in Hungary January 31, 1895, No. 2,089; in Austria May 16, 1895, No. 45/1,723; in Straits Settlements July 20, 1895, No. 422; in Ceylon August 9, 1895, No. 481, and in India August 22, 1895, No. 2,428.

*To all whom it may concern:*

Be it known that we, HERMANN PLATZ, a subject of the Emperor of Germany, residing at Carlsruhe, Grand Duchy of Baden, Germany, and SAMUEL LEENDERT HUIZER, a subject of the Queen of the Netherlands, residing at Gravenhage, Netherlands, have invented a certain new and useful Improvement in Apparatus or Machinery for Closing and Securing Metal Tubes, (for which we have obtained the following foreign patents: in Austria, dated May 16, 1895, No. 45/1,723; in Belgium, dated January 19, 1895, No. 113,707; in Ceylon, dated August 9, 1895, No. 481; in France, dated January 19, 1895, No. 244,466; in Germany, dated October 17, 1894, No. 82,532; in England, dated January 19, 1895, No. 1,320; in Hong-Kong, dated January 19, 1895; in Hungary, dated January 31, 1895, No. 2,089; in India, dated August 22, 1895, No. 2,428 P; in Straits Settlements, dated July 20, 1895, No. 422, and in Switzerland, dated January 19, 1895, No. 9,893,) of which the following is a specification.

This invention relates to a construction of apparatus or machinery for closing metal tubes of soft metal, such as tin, that are filled with a liquid or pasty substance. The operations carried out by such apparatus either singly or in combination consist, essentially, in the following: By means of suitable stamps or dies the upper part of a metal tube, when about half filled with liquid, is first pressed flat and in such flattened part transverse grooves are formed by pressing, so that it can be readily folded together at such grooves. The layers of metal are thus folded together and are lastly secured by an eyelet, rivet, or by other suitable riveting appliances. This method not only effects a perfectly tight closure, but also affords the greatest possible security against improper opening, as any such attempt would leave clearly-visible marks.

On the accompanying drawings, Figures 1, 2, and 3 show a machine in which the entire process, namely, the feeding in the tubes, the closing, and the riveting, is effected automatically. Fig. 2 is a plan, and Fig. 3 a cross-section on line 1 11, Fig. 2.

Figure 1:
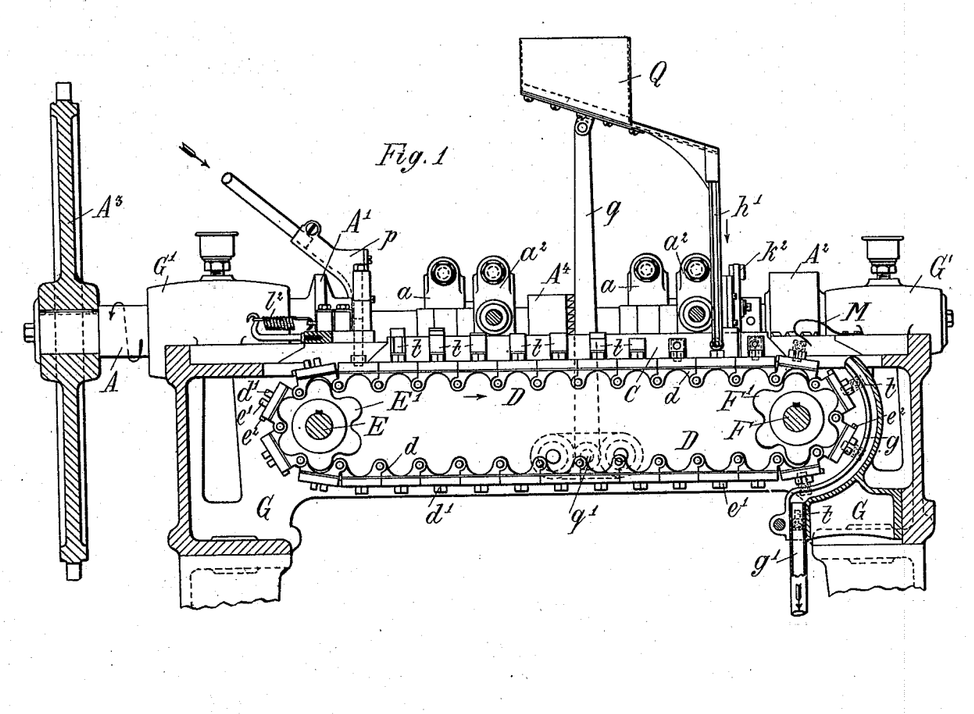
Fig. 1 is a vertical longitudinal section.
Figure 2:
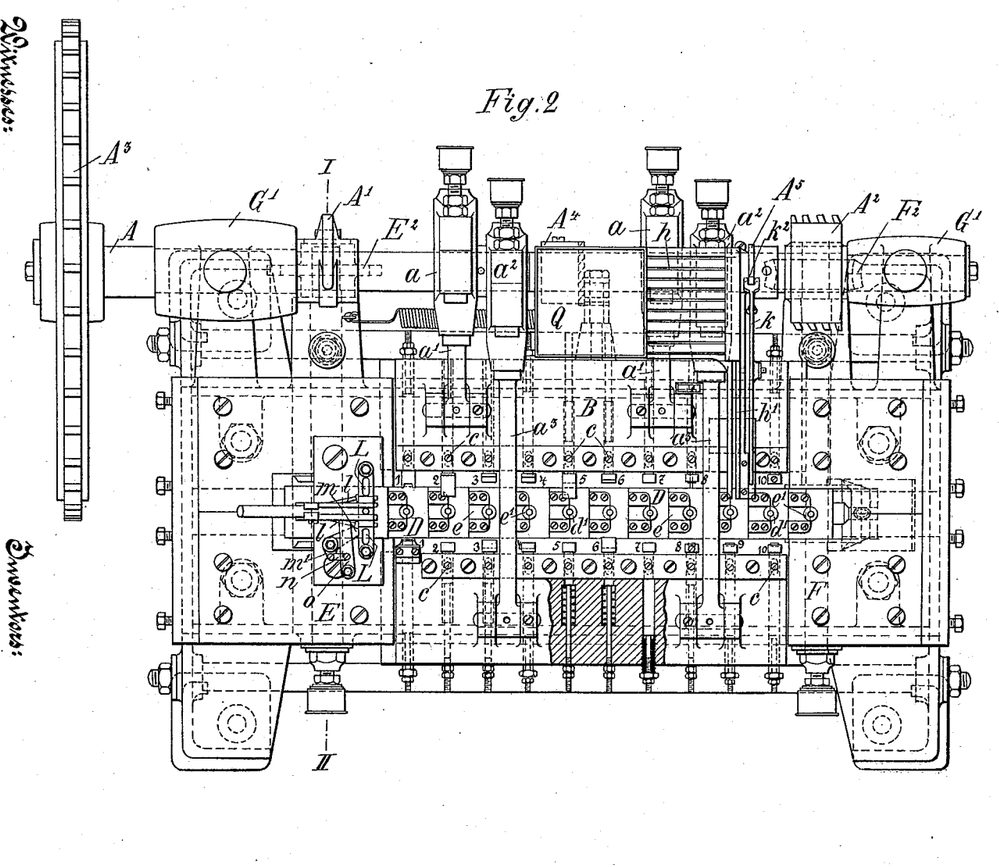
Figure 3:
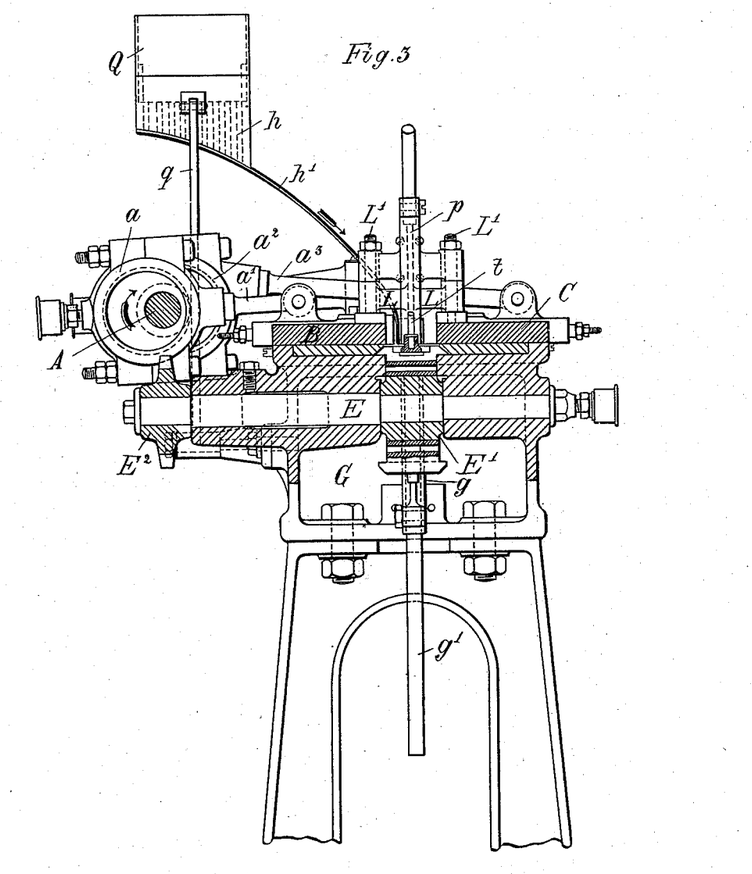

The machine shown at Figs. 1, 2, and 3 effects quite automatically the closing of the tubes in the manner shown at Figs. 4 to 13. These figures show the ten pairs of dies between which the tubes are successively brought in order to be subjected step by step to the closing process. Only the heads of the dies are shown in the views Figs. 4 to 13, in each case in the open position, after having performed the operation shown on the tube situated between them.

Figure 4:
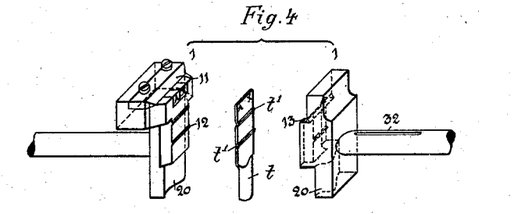
Figs. 4 to 13 show detached the ten pairs of stamps of the said machine, some of these being shown in section. Between each pair of dies is shown the tube having the operation which the dies effect performed thereon, so that the entire process in all its stages is shown by these figures.
Figure 5:
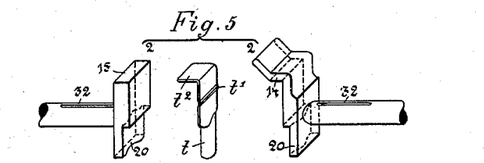
Figure 6:
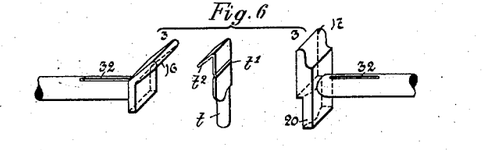
Figure 7:
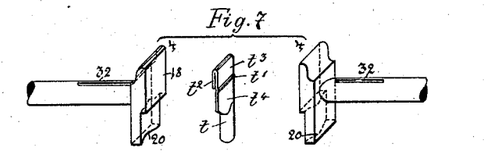
Figure 8:
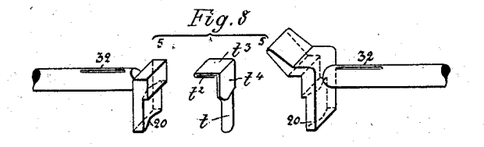
Figure 9:
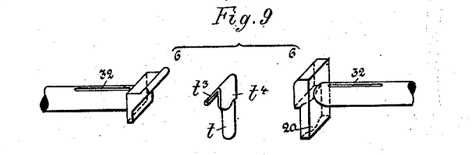
Figure 10:
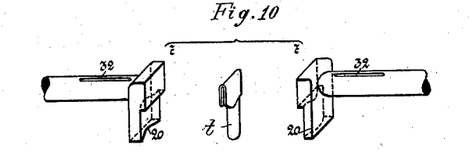
Figure 11:
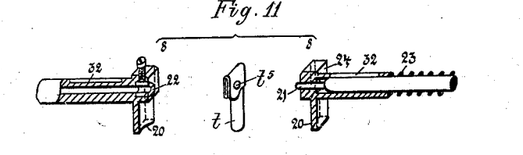
Figure 14:
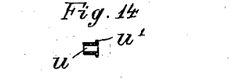
Fig. 14 shows one of the eyelet-rivets employed for securing the tube.

The dies 1 1, Fig. 4, effect the flattening together of the empty upper part of the tube, and at the same time both marking it with a private mark by means of a separate die 11, which mark is situated inside when the tube is folded over, and pressing transverse grooves *t'* into the flattened part by means of the ribs 12 on the one die and grooves 13 on the other die. These dies are also advantageously combined with a cutter for trimming the upper edge of the tube simultaneously with the flattening. In order to prevent the lower filled part of the tube from being damaged during the pressing, the dies are formed at the lower part with hollows 20 20, which are also provided in all the following dies. The transverse grooves *t'* have for their object to facilitate and render uniform the folding over of the flattened part of the tube. The tube prepared as at Fig. 4 then passes between the second pair of dies 2 2, Fig. 5. These dies do not effect any pressure, but only bend over the topmost portion $t^2$ of the tube, the bent projection 14 of the one die being made to press against such part and to bend it over the top surface 15 of the other part. The part $t^2$ thus bent into a horizontal position is then bent farther downward by the next dies 3 3, Fig. 6, by means of the inclined projection 16 in combination with the support 17. Lastly the part $t^2$ is pressed tightly against the part $t^3$ by dies 4 4, Fig. 7. In a similar manner the following dies, 5 5, Fig. 8, 6 6, Fig. 9, and 7 7, Fig. 10, effect the bending over the parts $t^2 t^3$ and the pressing them flat against the part $t^4$. The tube is thus securely closed, and in order to effectually prevent the opening of the same the folded parts are now riveted together. For this purpose an eyelet $u$, Fig. 14, is employed. The tube is first brought between the dies 8 8, Fig. 11, which pierce a hole therein, this being effected by a punch 21 on the one die situated opposite a hole 22 in the other die. The punch is advantageously provided with a spring-abutment 24, so that during the perforation of the tube by the punch the former is held with spring-pressure by the abutment 24, the spring 23 being more or less compressed, and thus any separation of the folded parts of the tube from each other during the perforation is prevented. The abutment only releases the tube again when the punch has been almost entirely withdrawn from the perforation, so that in this case also no opening of the folds can occur.

Figure 12:
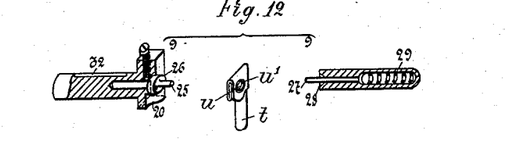

The insertion and riveting over of the eyelet are effected by the dies 9 9, Fig. 12, one of which has the fixed punch 25 with the pressing-flange 26, while the other has a spring-pin 27, which is pressed forward by a spring 29. On the front end of the pin 27 is placed, by a device presently to be described, one of the eyelets $u$. When the dies 9 9 advance toward each other, the pin 27 first introduces the eyelet into the previously-prepared hole in the tube. The pressing-punch 25 26 then bears against the pin 27, forcing it back against the spring 29, and then, entering the interior of the eyelet $u$, effects the turning over and riveting of its edge by means of the flange 26, the flange $u'$ of the eyelet being at the same time made to bear tight against the other face of the tube. The face of the right-hand die has a recess 28 for the flange $u'$ to fit into, so that the tube may bear close against the face of this die during the riveting.

Figure 13:
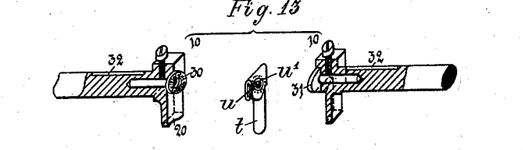

The last dies 10 10, Fig. 13, only have for their object to impress any desired marks or directions upon the flat part of the tube.

The above-described dies are arranged in two slides B C in the machine at Figs. 1, 2, and 3, in which these slides are guided horizontally.

The slides are alternately moved toward and from each other, so that all the dies effect their operations simultaneously. They are actuated from the driving-shaft A, mounted in bearings G' G' on the framing G, by means of eccentrics $a$ $a$ and $a^2$ $a^2$ and the eccentric-rods $a'$ $a'$ and $a^3$ $a^3$, the eccentrics of the two slides being arranged in opposite positions.

All the other parts of the machine are also actuated from the shaft A, which receives motion through a spur-wheel $A^3$.

The tubes to be closed are all made to pass consecutively between the dies, this being effected by the endless traveling chain D, Fig. 1, which passes around the chain-wheels E' and F' on the shafts E and F. The chain-links are closed at top and carry the tube-holders, into which are inserted the tubes.

The dies are all situated at exactly the same distances apart, and the chain-links have the same pitch, so that the tube-holders are also situated at the same distances apart from center line to center line as the dies. In consequence thereof if a tube-holder with its tube is situated in the correct position between a pair of dies all the other tubes will be situated in correct positions between the other dies, and consequently all the dies can perform their operations simultaneously.

For the regular working of the machine it is necessary that the chain with the tubes shall after each operation—i. e., at each revolution of the driving-shaft A and resulting to-and-fro motion of the dies—be advanced such a distance that all the tubes shall be moved from the dies which have operated upon them to the next following dies. It is also necessary that at the side of the machine from which the chain advances toward the dies a fresh tube shall be introduced into a holder at each successive step, this being effected either by the machine, as hereinafter described, or by hand. Lastly, the finished tubes as they issue from between the last pair of dies are removed either automatically by the machine or by hand.

The step-by-step motion of the chain is effected by means of the worm $A^2$ on the shaft A, which gears with a wheel $F^2$, fixed on the shaft F. The screw-thread only extends partly around the worm $A^2$, so that during each rotation of the shaft A there takes place alternately a partial rotation of the shaft F and a corresponding advance of the chain and a period of rest. Such partial rotation of shaft F is made to correspond exactly with the distance which the chain requires to travel for carrying the tubes from the one pair of dies to the next. For preventing any accidental motion of the chain a cam A' is provided on shaft A, gearing with a space-wheel $E^2$ on the shaft E. The cam A' is at right angles to the space-wheel $E^2$ and its tooth takes into a space after the completion of each advance of the chain, thus holding the shaft E, with its chain-wheel, stationary during the time that the worm $A^2$ is out of gear with the worm-wheel $F^2$—i. e., while the dies are performing their operations on the tubes.

The apparatus for automatically supplying the tubes to the holders of the endless chain is shown detached at Figs. 22 to 25, while its general arrangement is shown at Figs. 1 to 3. The tubes are placed in the channel $p$, this being effected either by hand, or the channel might be in connection with a special machine, (not forming part of the present invention,) in which the filling of the tubes is effected, so that the filled tubes are automatically conveyed from this machine to the closing-machine.

The channel $p$ is situated over the point where the tubes have to be introduced into the tube-holders of the chain and is bent downward. Its opening is generally closed by a tongue $o'$, so that a tube can only pass when this tongue moves away. Below the opening is a vertical channel $p'$, Fig. 22. This is divided in the middle, being constituted by two flaps L L, of which each one has at the contiguous parts $L^2$ one semicylindrical half of the channel $p'$, as seen at Figs. 23 and 24.

The flaps L are pivoted at $L'$ and are ordinarily held by a spring $l^2$ in the closed position, (shown at Fig. 24,) being connected with such spring by means of the rods $l$ $l$ and plate $l'$.

The channel $p'$ extends to immediately over the opening of the passing tube-holder $d'$ $e'$. These embrace the lower end of the tube, and in order that the upper part of the tube can issue from the channel $p'$ when the chain D moves forward in the direction of the arrow the two flaps must be moved apart. For this purpose the parts $L^2$ are formed at bottom with an enlargement $L^4$, into which the tube-holder takes. On the forward motion the latter pushes the two flaps open, so that the tube can freely issue.

Figure 23:
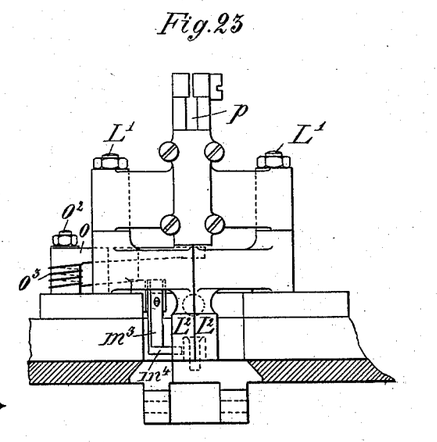
Figure 24:
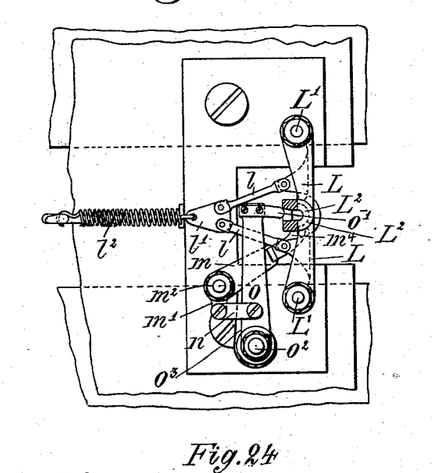
Figure 25:
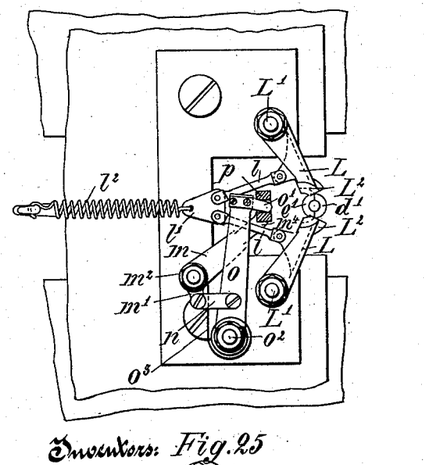

The two positions, respectively, at the moment of the entrance of the tube into the holder and the subsequent opening of the flaps are shown at Figs. 24 and 25. Immediately after the tube-holder has passed through the flaps L these close again under the action of the spring $l^2$, so that another tube can be delivered into the next tube-holder. In order that with this arrangement the tubes may be prevented from issuing from the channel $p$ before the proper time, the opening thereof is, as before stated, ordinarily closed by a tongue $o'$. At the moment when a tube is to descend to the tube-holder the tongue is withdrawn. This motion is also effected by means of the tube-holder, as shown at Figs. 22 to 25. The tongue $o'$ is fixed on a lever $o$, which is pivoted at $o^2$ to the table, so as to turn horizontally. By means of the spring $o^3$ it is usually held in the position shown at Fig. 25. The lever $o$ is also connected by a pivoted link $n$ with an elbow-lever $m$ $m'$, which is pivoted at $m^2$. From the end of this lever an arm $m^3$, Fig. 23, passes downward and carries a horizontal extension $m^4$, that lies in the path of the tube-holders. When one of the latter arrives in the position in which a tube can be delivered into it, it presses the part $m^4$ back, as at Fig. 24, thereby causing elbow-lever $m$ $m'$ to move so as to withdraw lever $o$ and consequently remove tongue $o'$ from the channel, so that on the arrival of a tube this can fall into the holder $d'$ $e'$, after which channel $p'$ is made to open, as described, so as to let the tube-holder and tube issue, and on such advance the tube-holder releases the tongue mechanism again, so that the spring $o^3$ can again cause the tongue to close the channel. Immediately afterward the flaps L close again.

The tube-holders may consist of simple sockets fixed on each link of the chain; but it is preferable to construct the chain-links and tube-holder in the manner shown at Figs. 18 to 21. The tube-holder $d'$ $e'$ is formed of two parts, the one part, $d'$, being fixed to the chain-link $d$, while the other, $e'$, is fixed to a sliding piece $e$, which is pressed outward by a spring $f$. The slide $e$ projects with a part $e^2$ on one side beyond the link. When the links are situated in line with each other in the horizontal position, the one link presses the projection $e^2$ of the slide $e$ of the next link inward, and thus closes the two parts of the tube-holder $d'$ $e'$. When the chain passes around the wheels, the projections $e^2$, Fig. 1, are released by the contiguous links, so that the spring $f$ can push the slide $e$ back and thus move the parts $d'$ $e'$ apart.

Figure 22:
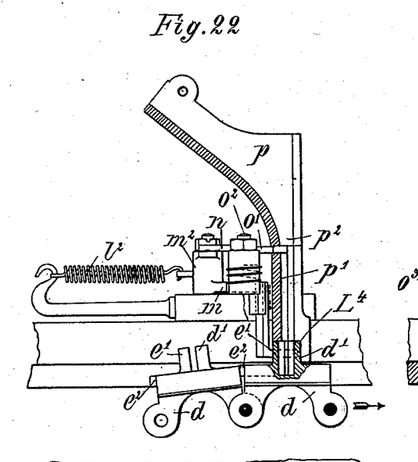
Figs. 22 to 25 show the arrangement for conveying the tubes to the transport-chain, Fig. 32 showing an elevation, Fig. 23 a side view, and Figs. 24 and 25 plans with two positions of the operative parts.

The feed apparatus delivers the tubes into the tube-holders at the point where the chain-links after leaving the wheel $E'$ are passing into the horizontal position, and consequently while the tube-holder is still open, as at Figs. 1 and 22. Immediately afterward the tube-holder is closed by the advance of the chain, and the tube is then held securely in the holder during the entire passage through the dies, the inner diameter of the holder being made to correspond exactly with the outer diameter of the tube.

Figures 15, 16:
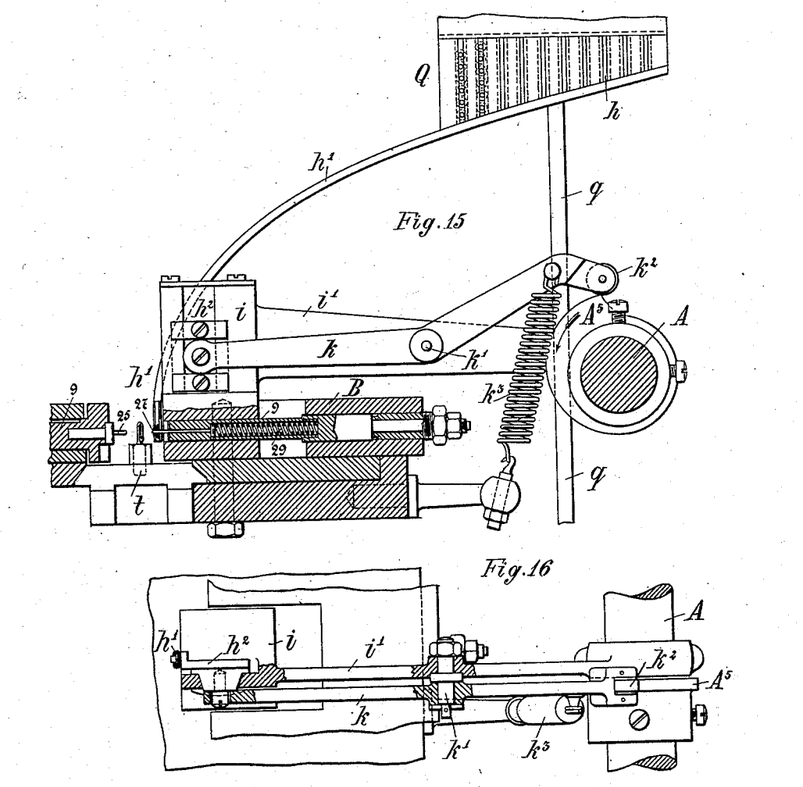
Figs. 15, 16, and 17 show the arrangement for supplying and riveting the eyelets.

The pair of dies 9 9, by means of which the tube is riveted, is supplied with the eyelet-rivets by means of an apparatus shown detached at Figs. 15 and 16, the general arrangement being shown at Figs. 1 and 3.

Figure 17:
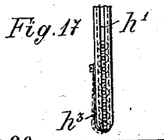
Figure 18:
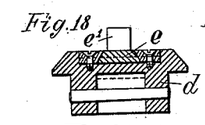
Figs. 18 to 21 show different views of a link of the transporting-chain.
Figure 19:
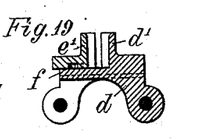
Figure 20:
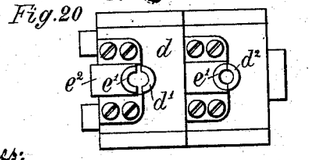
Figure 21:
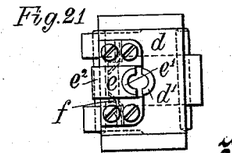

The eyelets are contained in a receptacle Q, to which a continual shaking motion is imparted. For this purpose it rests upon a rod $q$, pivoted at its lower end $q'$ to the framing and receiving a continuous to-and-fro motion from shaft A by a shaking device $A^4$, Figs. 1 and 2. In consequence of such motion the eyelets slide through holes in the bottom of the receptacle into inclined channels $h$, which lead into the common channels $h'$, down which they descend to the device 25 27. The channels are so formed as to guide the flange of the eyelets while the neck thereof is situated in the slot of the channels, as shown at Figs. 16 and 17, which show, respectively, a cross-section and a front view of the lower part of the channel. The lower end of the channel $h'$ is open and the lowest eyelet is held back by a spring $h^3$, Fig. 17.

The lower end of the feed-channel $h'$ is also provided with a slide $h^2$, that is moved up and down in the framing. This is effected by means of a two-armed lever $k$, pivoted at $k'$, the one arm of which carries the slide $h^2$, while the other arm, which is held down by the spring $k^3$, has a roller $k^2$, bearing upon the cam $A^5$.

The delivery of the lowest eyelet is effected as follows: While the die $q$ advances with the pin 27, the channel $h'$ is in the lowest position, so that the pin can pass through the lowest eyelet. When this is done, the slide $h^2$ rises with the channel $h'$ and the pin 27 retains the bottom eyelet, so that in pressing back the spring $h^3$ it is drawn out of the channel. The spring immediately springs back and prevents the next following eyelet from falling out. When the eyelet has been seized in this manner by the pin 27, the insertion and riveting thereof are effected, as previously described. When after the riveting has been effected the dies recede again, the slide moves downward with the channel in order to bring the next eyelet in the path of the pin 27.

For removing the riveted tubes from the holders the arrangement shown at Fig. 1 can be used. While the holder is passing with its link onto the wheel the flattened part of the tube passes into a slot $g$ until the tube arrives over a channel $g'$, extending downward, whereupon it can fall freely downward, as the tube-holders $d'$ $e'$ are opened as the chain turns downward, as above described.

At M may be provided an electrical contact or other suitable device for actuating a counter on the passage of the finished tubes for the purpose of counting the number of tubes completed by the machine.

The manner of carrying the dies in the slides B and C can be variously arranged.

It is of advantage to provide the stems of all the dies with adjusting screw-nuts or equivalent devices for accurately adjusting them in position, as shown at Fig. 3. Part of the slides is here shown in section in order to show the arrangement of the dies.

The dies might also be arranged with spring action. In Fig. 3 all those dies are thus formed that do not require to exert material pressure. The dies must also be so arranged or guided that they cannot turn on their axes during operation. In Fig. 2 this is effected by pins $c$, screwed into the slides, which take into slots 32, Figs. 4 to 13, on the stems of the dies.

Having now particularly described and ascertained the nature of the said invention and in what manner the same is to be performed, we declare that what we claim is—

1. In a machine for closing tubes, the combination with a pair of dies and means for intermittently operating them, of a carrier longitudinally movable beneath the plane in which the dies are located and provided with a tube-holder for supporting a tube in a vertical position to bring its upper portion between said dies, substantially as herein specified.

2. In a machine for closing tubes, the combination with a pair of dies and means for intermittently operating them, of a carrier longitudinally movable beneath the plane in which the dies are located and provided with a movable tube-holder for supporting a tube in a vertical position and arranged to release the same when beyond the dies, substantially as herein specified.

3. In a machine for closing tubes, the combination with a pair of dies and means for intermittently operating them, of a carrier longitudinally movable beneath the plane in which said dies are located and provided with a holder for supporting a tube in a vertical position and a tube-feeder having a cut-off passage arranged to be opened for the descent of a tube when centered on the tube-holder of the carrier, substantially as herein specified.

4. In a machine for closing tubes, the combination with a pair of dies and means for intermittently operating them, of a carrier longitudinally movable beneath the plane in which the dies are located and provided with a tube-holder for supporting a tube in a vertical position, and a detent for successively locking and unlocking the carrier when it is in position beneath said dies, substantially as herein specified.

5. In a machine for closing tubes, the combination with a series of dies and means for intermittently operating them, of a series of longitudinally-movable carriers beneath the plane in which the dies are located and each provided with a tube-holder for supporting a tube in a vertical position to bring its upper portion between said dies, and actuating mechanism for imparting an intermittent movement to the carriers, substantially as herein specified.

6. In a machine for closing tubes, the combination with pressing and closing dies, and means for intermittently operating them, a pair of riveting-dies, a rivet feed-channel $h'$, movable relative to the last-mentioned dies, together with a series of longitudinally-movable carriers beneath the plane in which the several dies are located, and each provided with a clamp for holding a tube in a vertical position to bring its upper portion successively between the dies and actuating mechanism for imparting an intermittent movement to the carriers, substantially as herein specified.

7. In a machine for closing tubes, an endless chain with tube-holders, two opposite slides higher than said chain and at each side thereof, and a series of pairs of dies carried thereon, in combination with means as eccentrics for giving thereto a motion to and from each other at right angles to the motion of the chain, whereby the upper portion of the tubes carried in vertical position by the latter are successively moved between, closed together and moved out from the dies, substantially as herein specified.

8. In a machine for closing tubes of the class herein described, a movable tube-holder, an upper feed-channel above the same and closed by a tongue o' at its lower end, a lower channel formed of two hinged spring-flaps L so related that a tube-holder shall be arrested at the end of the lower tube-channel, in combination with each other and with levers connected with the tongue, adapted to withdraw it and to allow a tube to descend into the tube-holder and with flaps so combined as to press open to allow the tube-holder to pass with a tube, and with spring arranged to bring the tongue and flaps back to the usual position, all substantially as herein specified.

9. In a machine for closing tubes, the combination with a series of dies and means for intermittently operating them, of a longitudinally-movable chain beneath the plane in which the dies are located and carrying the holders for supporting the tubes in a vertical position, each tube-holder comprising fixed and spring sections, the arrangement being such that each link, when in a horizontal position will bear against the spring-section of the preceding link and thereby close its holder, substantially as herein specified.

10. In a machine for closing tubes, the combination with horizontally-operating riveting-dies having a pin and means for intermittently operating them, of a longitudinally-movable chain beneath the plane in which the dies are located, a vertically-movable rivet-channel having its discharge terminating contiguous to said dies and provided with a spring rivet-retaining tongue arranged to yield when the die-pin seizes a rivet, substantially as herein specified.

11. In a machine for closing tubes, the combination with a pair of horizontally-operating dies, and a shaft A for actuating them, of an endless carrier longitudinally movable below the plane in which the dies are located and provided with tube-holders for each supporting a tube in a vertical position to bring its upper portion between said dies, and a motion-imparting shaft for the endless carrier having a worm-wheel arranged to be engaged by a semiworm on the main driving-shaft A, substantially as herein specified.

12. In a machine for closing tubes, the combination with a series of horizontally-operating dies and means for intermittently actuating them, a longitudinally-movable chain beneath the plane of the dies and passing around a sprocket-wheel F, said chain carrying tube-holders for supporting tubes in a vertical position, each holder comprising fixed and spring sections, the arrangement being such that each link when in a horizontal position will bear against the spring-section of the link preceding and relieve the same as the chain passes around the wheel F', together with a curved channel contiguous to said wheel for receiving the tube ends and terminating in a discharge-passage g', substantially as herein specified.

13. In a machine for closing tubes, the combination with suitable tube-holding means, of a pair of dies 1, 1, for compressing flatwise the upper and unfilled portion of the tube, and two pairs of dies 2, 2, 4, 4, subsequently operating successively on the same to bend and fold the closed portion of the tube, substantially as herein specified.

14. In a machine for closing tubes, the combination with suitable holding means, of a pair of dies 1, 1, for compressing flatwise the upper and unfilled portion of the tube, two pairs of dies 2, 2, 4, 4, subsequently operating successively on the same to bend and fold the closed portion of the tube, and a further series of pairs of dies 5, 5, 7, 7, arranged to act successively on such folded part to effect a second bending and folding, substantially as herein specified.

15. In a machine for closing tubes, a series of longitudinally-movable carriers such as those presented by the endless traveling chain D, and each provided with a tube-holder for holding a tube in a vertical position and actuating mechanism for imparting an intermittent movement to the carriers, in combination with a series of intermittently-operated dies 1, 1, 2, 2, 4, 4, for successively compressing and closing the upper portion of the tubes, substantially as herein specified.

16. In a machine for closing tubes, a series of longitudinally-movable carriers such as those presented by the endless traveling chain D, and each provided with a tube-holder for holding a tube in a vertical position and actuating mechanism for imparting an intermittent movement to the carriers, in combination with a pair of dies 1, 1, transversely ribbed and recessed respectively for compressing and transversely grooving the upper portion of a tube, and a second pair of dies 4, 4, for folding said compressed portion on the line of the groove, together with die-carrying slides B, C, and connections for intermittently effecting their approach and recession, substantially as herein specified.

In testimony whereof I have hereunto set my hand, at Mannheim, Germany, this 25th day of February, 1895, in the presence of two subscribing witnesses.

HERMANN PLATZ.

Witnesses:
 MARTIN FISCHER,
 THEOD. JACOB.

In testimony whereof I have hereunto set my hand, at Rotterdam, Netherlands, this 6th day of March, 1895, in the presence of two subscribing witnesses.

SAMUEL LEENDERT HUIZER.

Witnesses:
 AIRE H. VOORWINDEN,
 HERMAN A. REQUE.